(12) United States Patent
Singh et al.

(10) Patent No.: US 10,210,901 B2
(45) Date of Patent: Feb. 19, 2019

(54) INTELLIGENT MULTIMEDIA PLAYBACK RE-POSITIONING

(71) Applicant: ARRIS Enterprises LLC, Suwanee, GA (US)

(72) Inventors: Virendra Singh, Bangalore (IN); Lakshmi Arunkumar, Bangalore (IN); Murali S. Sahasranaman, Bangalore (IN); Krishna Prasad Panje, Bangalore (IN); Manu Shrot, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/147,179

(22) Filed: May 5, 2016

(65) Prior Publication Data

US 2016/0329080 A1 Nov. 10, 2016

Related U.S. Application Data

(60) Provisional application No. 62/157,824, filed on May 6, 2015.

(51) Int. Cl.
*H04N 21/6587* (2011.01)
*G11B 27/00* (2006.01)
(Continued)

(52) U.S. Cl.
CPC ............ *G11B 27/005* (2013.01); *G11B 27/11* (2013.01); *G11B 27/28* (2013.01); *H04N 5/783* (2013.01);
(Continued)

(58) Field of Classification Search
USPC ......................................................... 386/241
See application file for complete search history.

(56) References Cited

U.S. PATENT DOCUMENTS

| 2005/0163480 A1 | 7/2005 | Takemoto |
| 2009/0158323 A1* | 6/2009 | Bober .................. G11B 27/105 725/37 |

(Continued)

FOREIGN PATENT DOCUMENTS

JP 2000-333117 A 11/2000

OTHER PUBLICATIONS

PCT Search Report & Written Opinion, Re: Application No. PCT/US2016/030972, dated Jul. 19, 2016.

*Primary Examiner* — Nicholas T Corbo
(74) *Attorney, Agent, or Firm* — Bart A. Perkins

(57) ABSTRACT

Methods, systems and computer readable media may facilitate the repositioning of content based upon scene boundaries. In embodiments, content may be automatically repositioned at a scene boundary, so that the content presentation starts from a more meaningful and sensible point after a re-position (e.g., time-shift, trickplay, seek, etc.). Also provided herein is an approach to provide an option for the user to start playback of content from an absolute time based repositioned point or a scene based repositioned point. Scene change detection may be used to detect scene changes within a piece of multimedia content as the content is being received, played, or recorded by a device. Scene changes within a piece of content may be identified using scene meta-data created on a per content basis, wherein the meta-data includes the starting frame offset of each scene along with the duration of the scene.

14 Claims, 7 Drawing Sheets

(51) Int. Cl.
    *G11B 27/28*     (2006.01)
    *G11B 27/11*     (2006.01)
    *H04N 5/783*     (2006.01)
    *H04N 21/2387*   (2011.01)
    *H04N 21/44*     (2011.01)

(52) U.S. Cl.
    CPC ... *H04N 21/2387* (2013.01); *H04N 21/44008* (2013.01); *H04N 21/6587* (2013.01)

(56)         References Cited

U.S. PATENT DOCUMENTS

| | | |
|---|---|---|
| 2010/0172627 A1 | 7/2010 | Ohki et al. |
| 2012/0050012 A1* | 3/2012 | Alsina ............... H04N 21/4126 |
| | | 340/10.1 |
| 2013/0011116 A1* | 1/2013 | Barrett ................ G11B 27/105 |
| | | 386/230 |
| 2013/0251339 A1* | 9/2013 | Crowder .......... H04N 21/23439 |
| | | 386/241 |

\* cited by examiner

INTELLIGENT MULTIMEDIA PLAYBACK RE-POSITIONING

CROSS REFERENCE TO RELATED APPLICATION

This application is a non-provisional application claiming the benefit of U.S. Provisional Application Ser. No. 62/157,824, entitled "Intelligent Multimedia Content Re-Positioning," which was filed on May 6, 2015, and is incorporated herein by reference in its entirety.

TECHNICAL FIELD

This disclosure relates to the determination of a playback position after a trickplay operation is carried out on multimedia.

BACKGROUND

Currently, set-top boxes (STB) and other similar multimedia devices are deployed in heterogeneous environments and are configured to decode and record content on local storage or at a remote server (e.g., server within a wide area network (WAN)). A user may control the viewing experience of a piece of multimedia content by applying various trickplay functions to the output of the multimedia content. Content may be played back, time shifted or repositioned according to trickmodes such as fast-forward, rewind, seek, absolute or relative move and skip commands and other functions to skip unwanted parts of content or advertisements.

A user may use time-shifting, trickplay or other commands (e.g., skips, jumps, seeks, etc.) during content playback to move to a next/new position within a piece of multimedia content. Typically, during the time-shifting of content, a user is not so much worried about the timing accuracy for resuming normal playback, but more on scene accuracy (e.g., the user typically desires to resume playback of the content at a new scene). The current mechanisms for repositioning content are based on frame boundaries, thus, a repositioned presentation may start from anywhere within a scene (i.e., the reposition, entry point could be at any position within a scene). With repositioning based on frame boundaries, a user may miss portions of a scene or may be forced to apply a subsequent trickplay operation to the content to find a desired resume point in the content. Therefore, it is desirable to improve upon methods and systems for determining a playback position after a trickplay operation is carried out on a piece of multimedia.

BRIEF DESCRIPTION OF THE DRAWINGS

Like reference numbers and designations in the various drawings indicate like elements.

DETAILED DESCRIPTION

Figure 1:
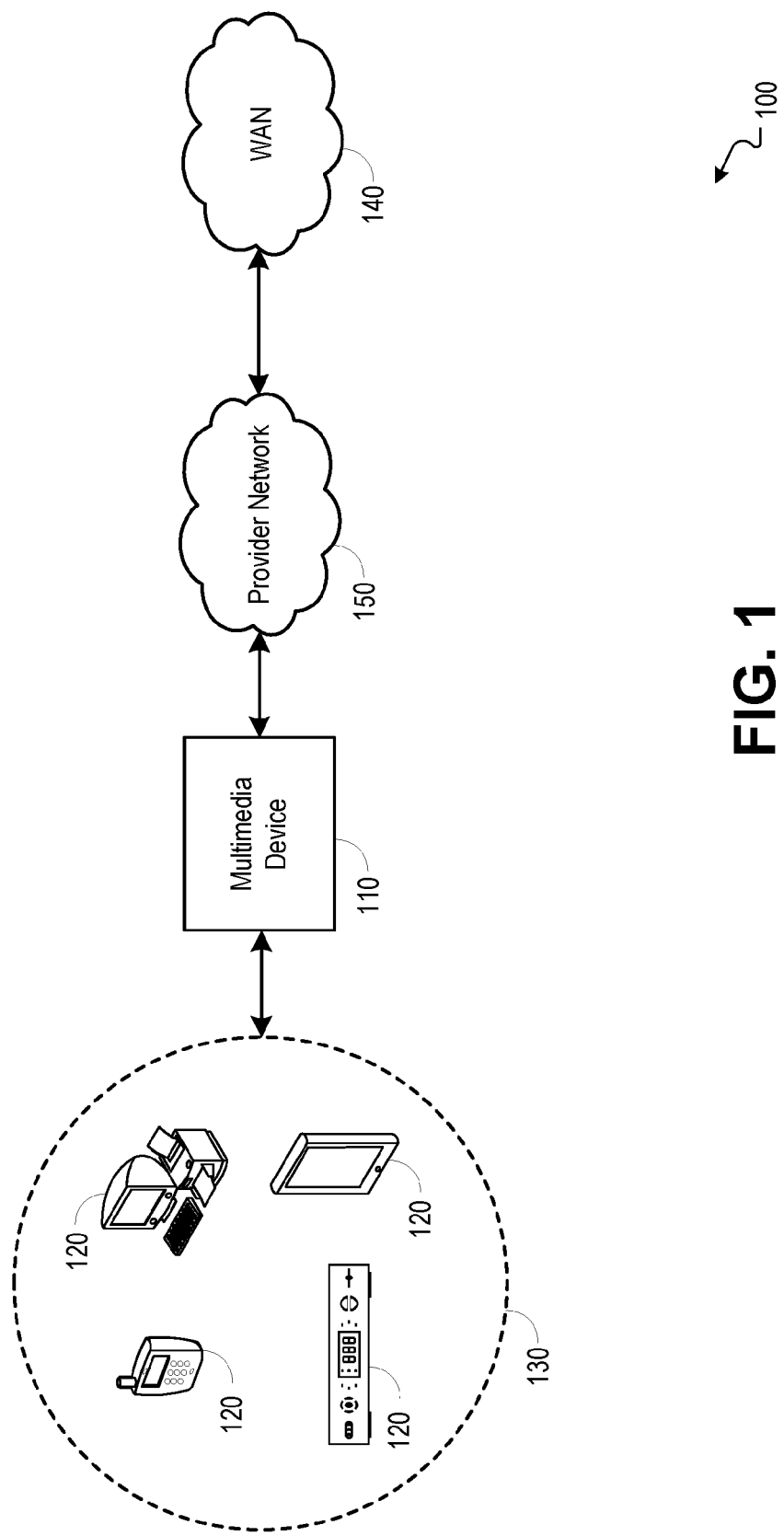
FIG. 1 is a block diagram illustrating an example network environment operable to facilitate the determination of a playback position based upon a scene boundary.

It is desirable to improve upon methods and systems for determining a playback position after a trickplay operation is carried out on a piece of multimedia. The methods, systems and computer readable media described herein facilitate the repositioning of content based upon scene boundaries. In embodiments, content may be automatically repositioned at a scene boundary, so that the content presentation starts from a more meaningful and sensible point after a re-position (e.g., time-shift, trickplay, seek, etc.). Also provided herein is an approach to provide an option for the user to start playback of content from an absolute time based repositioned point or a scene based repositioned point. Scene change detection may be used to detect scene changes within a piece of multimedia content as the content is being received, played, or recorded by a device. Scene changes within a piece of content may be identified using scene meta-data created on a per content basis, wherein the meta-data includes the starting frame offset of each scene along with the duration of the scene.

An embodiment of the invention described herein may include a method comprising: (a) applying a trickplay operation to a piece of multimedia content; (b) in response to a received resume command, identifying a current frame based upon a current playback position within the piece of multimedia content at the point at which the resume command is received; (c) identifying a scene associated with the current frame; (d) identifying a first frame of the scene; and (e) initiating playback of the piece of multimedia content from the first frame of the scene.

According to an embodiment of the invention, the method described herein further comprises outputting a prompt requesting a user to select between a playback of the piece of multimedia content from the first frame of the scene or from an inline frame immediately preceding the current frame.

According to an embodiment of the invention, the prompt comprises a display of the first frame of the scene and a display of the inline frame immediately preceding the current frame.

According to an embodiment of the invention, the method described herein further comprises: (a) receiving a user command to begin playback from the inline frame immediately preceding the current frame; (b) creating an entry point at the inline frame by repositioning a pointer to the inline frame; and (c) initiating playback of the piece of multimedia content from the inline frame.

According to an embodiment of the invention, the first frame of the scene is identified from meta-data retrieved from the piece of multimedia content.

According to an embodiment of the invention, one or more scene boundaries within the piece of multimedia content are identified and tagged as the piece of multimedia content is received, and the first frame of the scene is identified based on the one or more tagged scene boundaries.

According to an embodiment of the invention, the method described herein further comprises creating an entry point at the first frame of the scene by repositioning a pointer to the first frame of the scene.

An embodiment of the invention described herein may include an apparatus comprising: (a) a playback module configured to apply a trickplay operation to a piece of multimedia content; (b) a control interface configured to be used to receive a resume command; (c) a playback position module configured to identify a current frame based upon a current playback position within the piece of multimedia content at the point at which the resume command is received; (d) a scene boundary module configured to: (i) identify a scene associated with the current frame; and (ii) identify a first frame of the scene; and (e) the playback module being further configured to initiate playback of the piece of multimedia content from the first frame of the scene.

According to an embodiment of the invention, the apparatus described herein further comprises a display interface configured to be used to output a prompt requesting a user to select between a playback of the piece of multimedia content from the first frame of the scene or from an inline frame immediately preceding the current frame.

According to an embodiment of the invention: (a) the control interface is further configured to be used to receive a user command to begin playback from the inline frame immediately preceding the current frame; (b) the playback position module is further configured to create an entry point at the inline frame by repositioning a pointer to the inline frame; and (c) the playback module is further configured to initiate playback of the piece of multimedia content from the inline frame.

An embodiment of the invention described herein may include one or more non-transitory computer readable media having instructions operable to cause one or more processors to perform the operations comprising: (a) applying a trickplay operation to a piece of multimedia content; (b) in response to a received resume command, identifying a current frame based upon a current playback position within the piece of multimedia content at the point at which the resume command is received; (c) identifying a scene associated with the current frame; (d) identifying a first frame of the scene; and (e) initiating playback of the piece of multimedia content from the first frame of the scene.

According to an embodiment of the invention, the instructions are further operable to cause one or more processors to perform the operations comprising outputting a prompt requesting a user to select between a playback of the piece of multimedia content from the first frame of the scene or from an inline frame immediately preceding the current frame.

According to an embodiment of the invention, the instructions are further operable to cause one or more processors to perform the operations comprising: (a) receiving a user command to begin playback from the inline frame immediately preceding the current frame; (b) creating an entry point at the inline frame by repositioning a pointer to the inline frame; and (c) initiating playback of the piece of multimedia content from the inline frame.

According to an embodiment of the invention, the instructions are further operable to cause one or more processors to perform the operations comprising creating an entry point at the first frame of the scene by repositioning a pointer to the first frame of the scene.

FIG. 1 is a block diagram illustrating an example network environment 100 operable to facilitate the determination of a playback position based upon a scene boundary. In embodiments, a multimedia device 110 may be configured to provide multimedia services to one or more client devices 120. The multimedia device 110 may include a multimedia or residential gateway, a set-top box (STB), or any other device configured to receive, store, and/or deliver multimedia content to one or more client devices 120. Client devices 120 may include televisions, computers, tablets, mobile devices, STBs, game consoles, and any other device configured to receive a multimedia service.

In embodiments, multimedia content may be delivered from a multimedia device 110 to one or more client devices 120 over a local network 130 (e.g., a local area network (LAN), a wireless local area network (WLAN), a personal area network (PAN), etc.). The multimedia device 110 may receive services from and may communicate with an upstream wide area network (WAN) 140 through a connection to a provider network 150. It should be understood that the multimedia device 110 may operate as an access point to wirelessly deliver multimedia content to one or more client devices 120 that are associated with the multimedia device 110 as stations.

In embodiments, a multimedia device 110 may communicate with a client device 120 over a wired or a wireless connection. The multimedia device 110 may provide one or more channels or service sets through which services and communications may be delivered wirelessly to one or more client devices 120. A client device 120 may associate and authenticate with a multimedia device 110 or associated access point (e.g., wireless router, network extender, etc.), after which communications and services may be delivered from the multimedia device 110 to the client device 120. It should be understood that various protocols and/or standards (e.g., Wi-Fi, multimedia over coax alliance (MoCA), ZigBee etc.) may be used to deliver communications between a multimedia device 110 and client device 120.

A multimedia device 110 may output live or linear content to a client device 120 as the content is received at the multimedia device 110, or the multimedia device 110 may store content and output the stored content to a client device 120 at a later time. Content may be stored at the multimedia device 110, at a remote device within a corresponding customer premise, or at a server within an upstream network (e.g., WAN 140).

In embodiments, a piece of content received at a multimedia device 110 may be delineated according to a number of scene boundaries. For example, a received piece of content may have a plurality of scenes separated by one or more scene boundaries. When viewing the piece of content at a display device, a user might want to skip forward or backward to the beginning of a desired scene. Using the scene boundaries associated with the piece of content, the multimedia device 110 may be configured to identify a nearest, or most relevant scene boundary associated with the point at which a user brings the piece of content out of a trickplay mode. For example, when the user brings the content out of a trickplay mode, the multimedia device 110 may be configured to identify the beginning point of the current scene (e.g., preceding scene boundary) and to begin playback of the content from the identified beginning point. In embodiments, scene boundaries within a piece of content may be identified from meta-data associated with the content or may be identified by the multimedia device 110, or other device, using a scene change detection algorithm. The scene change detection algorithm may enable hardware scene change detection when the content is being played or recorded. For example, the beginning, end, and/or duration of a scene may be identified by determining the location of one or more scene changes within a piece of content.

It will be appreciated by those skilled in the relevant art that various techniques may be used to enable hardware scene change detection when a piece of content is being recorded, transcoded or played. For content that is being recorded as it is also being played, a firmware implementation can create scene meta-data that may assist in the identification of scene transition points. For content that is only recorded and not played at the time of recording, a firmware implementation can create scene meta-data at a later stage, for example when the recorded content is played for the first time or when getting transcoded. The scene meta-data created on a per content basis may contain a starting frame offset for each scene along with the duration of the scene. Thereby, the scene meta-data may aide in fetching to necessary offsets within the content when the playback of the content is initiated or resumed.

In embodiments, playback of a piece of content delivered to a client device 120 by the multimedia device 110 may be controlled by user input. For example, the user may control playback, trickplay, and recording functions at the multimedia device 110 using various buttons (e.g., record, play, fast-forward, rewind, skip, and other trickplay controls) at a control device (e.g., remote control unit (RCU)).

In embodiments, while a trickplay function is being carried out on a piece of multimedia content, and when user input instructs the multimedia device 110 to stop trickplay of the content, the content may be resumed from the frame being acted upon at the instance when the user input is recognized. It should be understood that there are various techniques and calculations for stopping trickplay of content at an individual frame (e.g., timing, frame count techniques, etc.).

In embodiments, the individual frame recognized as the current frame may be a frame that is in between two I-frames (inline frames). The multimedia device 110 may select an entry point by repositioning a pointer selecting a frame within the content stream from which to resume playback. The pointer may be repositioned to the first I-frame preceding the current frame, so that the content is resumed from a clear, independent frame. It should be understood that various techniques may be used to identify an I-frame associated with the current frame (e.g., using frame dependency information of the current frame).

In embodiments, the multimedia device 110 may identify a scene associated with the current frame. The multimedia device 110 may retrieve an association between the current frame and a scene. For example, the multimedia device 110 may pull data from the incoming content stream, and may store associations between each frame of the content and a particular scene. The multimedia device 110 may designate the beginning of a scene as the entry point by repositioning the pointer to the first I-frame of the scene associated with the current frame so that the content is resumed from the beginning of the current scene. It will be appreciated by those skilled in the art that various techniques may be used to gather and store scene change data associated with a content stream. It should be understood that the first I-frame of a scene may be identified using various techniques (e.g., based on timing of the content stream, based on frame count, etc.).

In embodiments, when a trickplay function is being carried out on a piece of content, and user input instructs the multimedia device 110 to bring the content out of the trickplay status, the multimedia device 110 may identify an entry point at the first I-frame preceding the current frame and/or an entry point at the first frame of the scene associated with the current frame. A user may then be prompted to select whether to resume the content from the first I-frame preceding the current frame or the first frame of the scene associated with the current frame. For example, split video windows may be displayed to a user, wherein a first window includes one or more frames at the first I-frame preceding the current frame and a second window includes one or more frames at the first frame of the scene associated with the current frame. The multimedia device 110 may then reposition a pointer to either the first I-frame preceding the current frame or the first frame of the scene associated with the current frame based upon the user selection. It should be understood that the multimedia device 110 may be configured with a default option for selecting between two or more entry points. For example, the multimedia device 110 may be configured to automatically begin playback of content coming out of trickplay at the first frame of the scene associated with the current frame. It should be further understood that a user selection of an entry point option may be used by the multimedia device 110 to control future entry point decisions made with respect to the piece of content currently being viewed and/or content that is subsequently output by the multimedia device 110.

Figure 2:
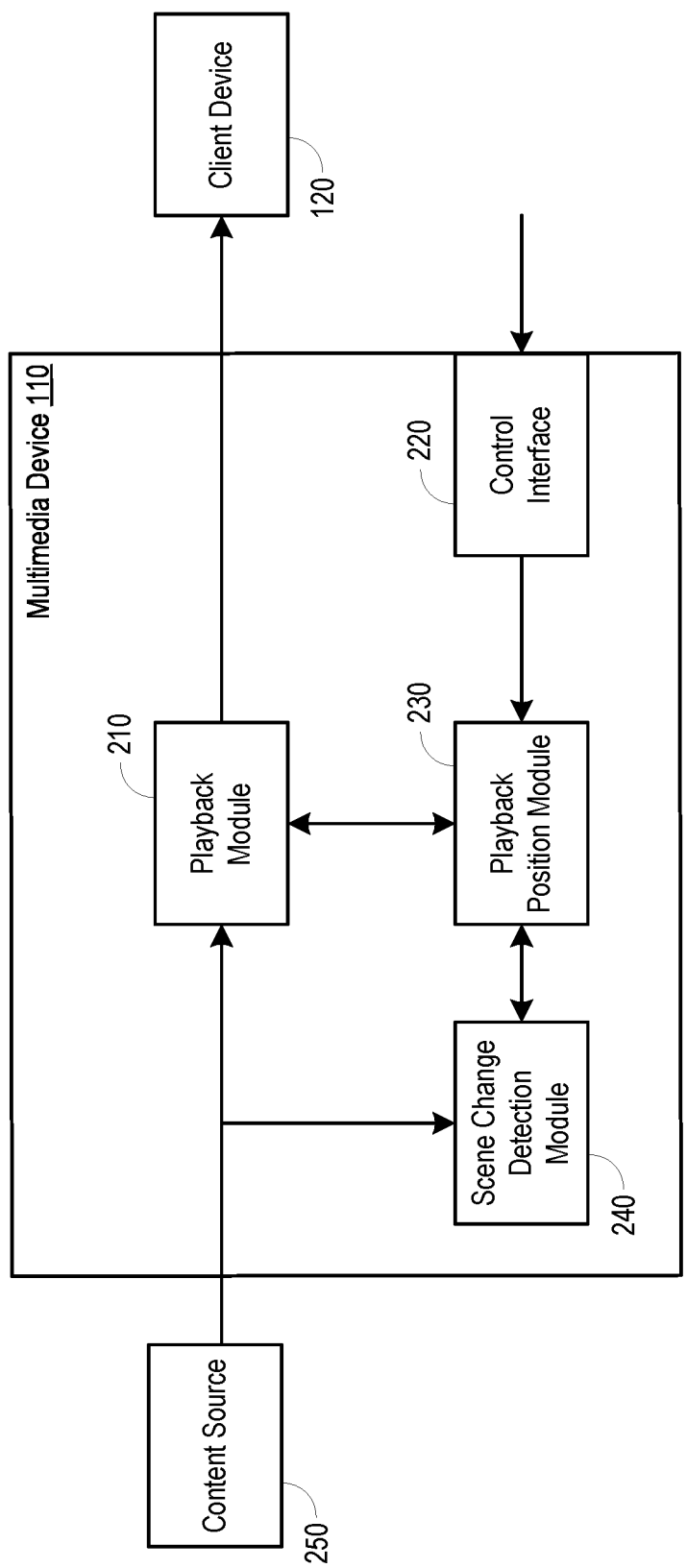
FIG. 2 is a block diagram illustrating an example multimedia device operable to facilitate a re-positioning of a playback position at a scene boundary within a piece of content.

FIG. 2 is a block diagram illustrating an example multimedia device 110 operable to facilitate a re-positioning of a playback position at a scene boundary within a piece of content. The multimedia device 110 may include a playback module 210, a control interface 220, a playback position module 230, and a scene change detection module 240. The multimedia device 110 may include a multimedia or residential gateway, a set-top box (STB), or any other device configured to receive, store, and/or deliver multimedia content to one or more client devices 120.

In embodiments, the multimedia device 110 may communicate with one or more client devices 120 over a wired or a wireless connection. The multimedia device 110 may output content and/or other services to client devices 120 through an interface and may receive requests for content and/or other upstream communications through the interface. It should be understood that the interface configured to receive and output communications may include various wired and/or wireless interfaces using various protocols and/or standards (e.g., Wi-Fi, multimedia over coax alliance (MoCA), ZigBee, Ethernet, etc.) that may be used to deliver communications between a multimedia device 110 and client device 120. For example, the multimedia device 110 may communicate with one or more client devices 120 over a local network 130 of FIG. 1.

In embodiments, content may be received at the multimedia device 110 from a content source 250. The content source 250 may reside within the multimedia device 110, at a remote device within an associated customer premise, or at a server within an upstream network (e.g., provider network 150 of FIG. 1, WAN 140 of FIG. 1, etc.). Communications and services received at the multimedia device 110 may be forwarded to one or more client devices 120 through one or more interfaces. For example, content streams (e.g., live or linear content, VoD content, recorded content, etc.) may be recorded by the multimedia device 110 and stored at local or remote storage, and/or the content streams may be forwarded to one or more client devices 120 through one or more interfaces.

In embodiments, the output of content (e.g., both recorded and linear content) may be controlled by user requests received from a control device (e.g., RCU) through the control interface 220. For example, a user may view available content through a menu displayed at a display device, and may select content for delivery from the multimedia device 110 to a client device 120. The user may control playback and recording functions at the multimedia device 110 using various buttons at a control device (e.g., record, play, fast-forward, rewind, skip, and other trickplay controls).

In embodiments, a playback module 210 may control playback of multimedia content received from a content source 250 (e.g., digital video recorder storage, upstream server, etc.). The playback module 210 may output multimedia content to a display (e.g., client device 120 or display that is otherwise associated with or connected to the multimedia device 110). The speed of content playback may be controlled by a user. For example, user input may be received through the control interface 220. The user input may include any of various trickplay requests (e.g., skip, seek, jump, fast-forward, rewind, etc.). User input may also include functions operable to stop or resume trickplay of content (e.g., play, pause, stop, etc.).

In embodiments, while a trickplay function is being carried out by the playback module 210 on a piece of multimedia content, and when user input instructs the multimedia device 110 to stop trickplay of the content, the content may be resumed by the playback module 210 from the frame being acted upon at the instance when the user input is recognized. It should be understood that there are various techniques and calculations for stopping trickplay of content at an individual frame (e.g., timing, frame count techniques, etc.).

In embodiments, the individual frame that the playback module 210 recognizes as the current frame may be a frame that is in between two I-frames. The playback position module 230 may select an entry point by repositioning a pointer selecting a frame within the content stream from which to resume playback. The pointer may be repositioned to the first I-frame preceding the current frame, so that the content is resumed from a clear, independent frame. It should be understood that various techniques may be used to identify an I-frame associated with the current frame (e.g., using frame dependency information of the current frame).

In embodiments, the playback position module 230 may identify a scene associated with the current frame. The playback position module 230 may retrieve an association between the current frame and a scene from the scene change detection module 240. For example, the scene change detection module 240 may pull data from the incoming content stream, and may store associations between each frame of the content and a particular scene. The playback position module 230 may designate the beginning of a scene as the entry point by repositioning the pointer to the first I-frame of the scene associated with the current frame so that the content is resumed from the beginning of the current scene. It will be appreciated by those skilled in the art that various techniques may be used to gather and store scene change data associated with a content stream. It should be understood that the first I-frame of a scene may be identified using various techniques (e.g., based on timing of the content stream, based on frame count, etc.).

In embodiments, when a trickplay function is being carried out on a piece of content, and user input instructs the multimedia device 110 to bring the content out of the trickplay status, the playback position module 230 may identify an entry point at the first I-frame preceding the current frame and/or an entry point at the first frame of the scene associated with the current frame. A user may then be prompted to select whether to resume the content from the first I-frame preceding the current frame or the first frame of the scene associated with the current frame. For example, split video windows may be displayed to a user, wherein a first window includes one or more frames at the first I-frame preceding the current frame and a second window includes one or more frames at the first frame of the scene associated with the current frame. The playback position module 230 may then reposition a pointer to either the first I-frame preceding the current frame or the first frame of the scene associated with the current frame based upon the user selection. It should be understood that the playback position module 230 may be configured with a default option for selecting between two or more entry points. For example, the playback position module 230 may be configured to automatically begin playback of content coming out of trickplay at the first frame of the scene associated with the current frame. It should be further understood that a user selection of an entry point option may be used by the playback position module 230 to control future entry point decisions made with respect to the piece of content currently being viewed and/or content that is subsequently output by the multimedia device 110.

Figure 3:
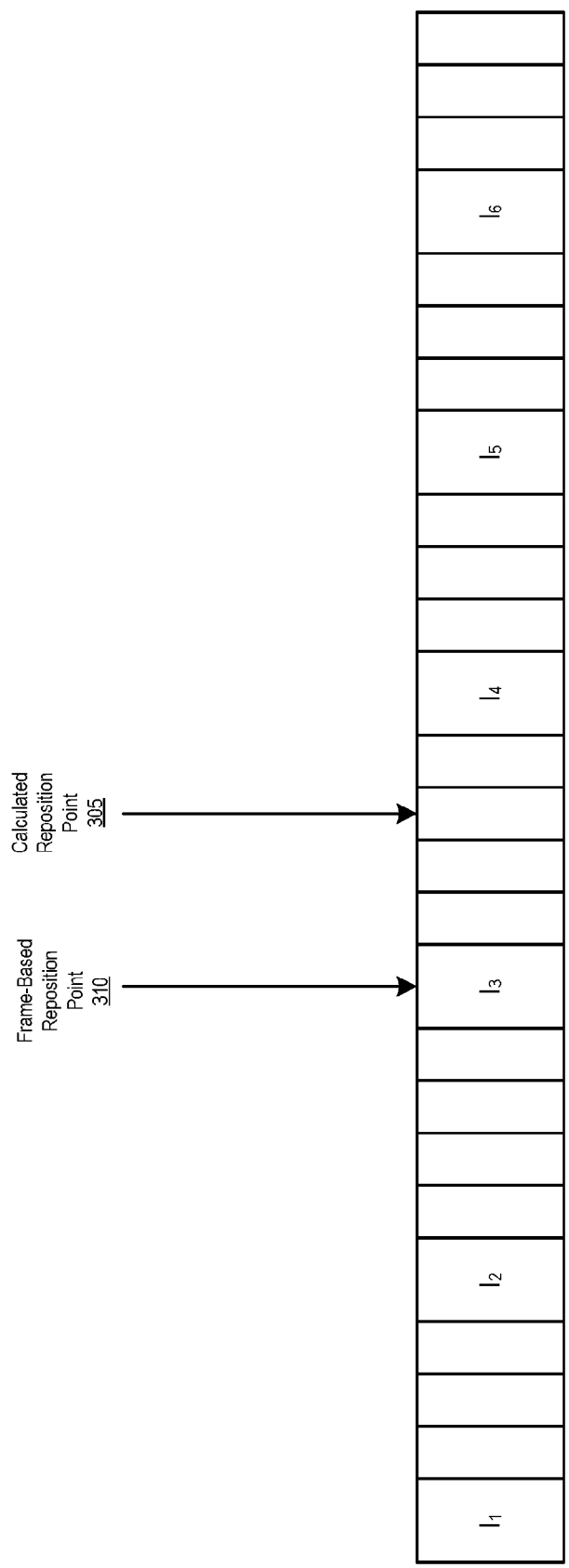
FIG. 3 shows a stream of frames associated with a piece of multimedia content.

FIG. 3 shows a stream of frames associated with a piece of multimedia content. The stream may include a plurality of I-frames (e.g., I1-6) and one or more other frames between I-frames. While a trickplay function (e.g., fast-forward, rewind, skip, seek, jump, etc.) is being carried out on the piece of content, and when an instruction is received to bring the content out of the trickplay status or otherwise resume normal playback of the content, a calculated reposition point 305 may be determined. The calculated reposition point 305 may be the frame that is determined to be the frame at which the content was at when the instruction to exit trickplay was received (i.e., the playback position according to the point at which the content is brought out of the trickplay function). It will be appreciated by those skilled in the relevant art that various methods and techniques may be used to determine the calculated reposition point 305 based upon the trickplay position and the time of exit from the trickplay.

In embodiments, the calculated reposition point 305 may be a frame other than an I-frame (as is the case in FIG. 3). A new entry point may be selected, for example, by the playback position module 230 of FIG. 2. The new entry point may be selected by repositioning a pointer at a frame other than the calculated reposition point 305. For example, the playback position module 230 may identify the first I-frame preceding the calculated reposition point 305 as the new entry point, and the pointer may be repositioned to the frame-based reposition point 310.

Figure 4:
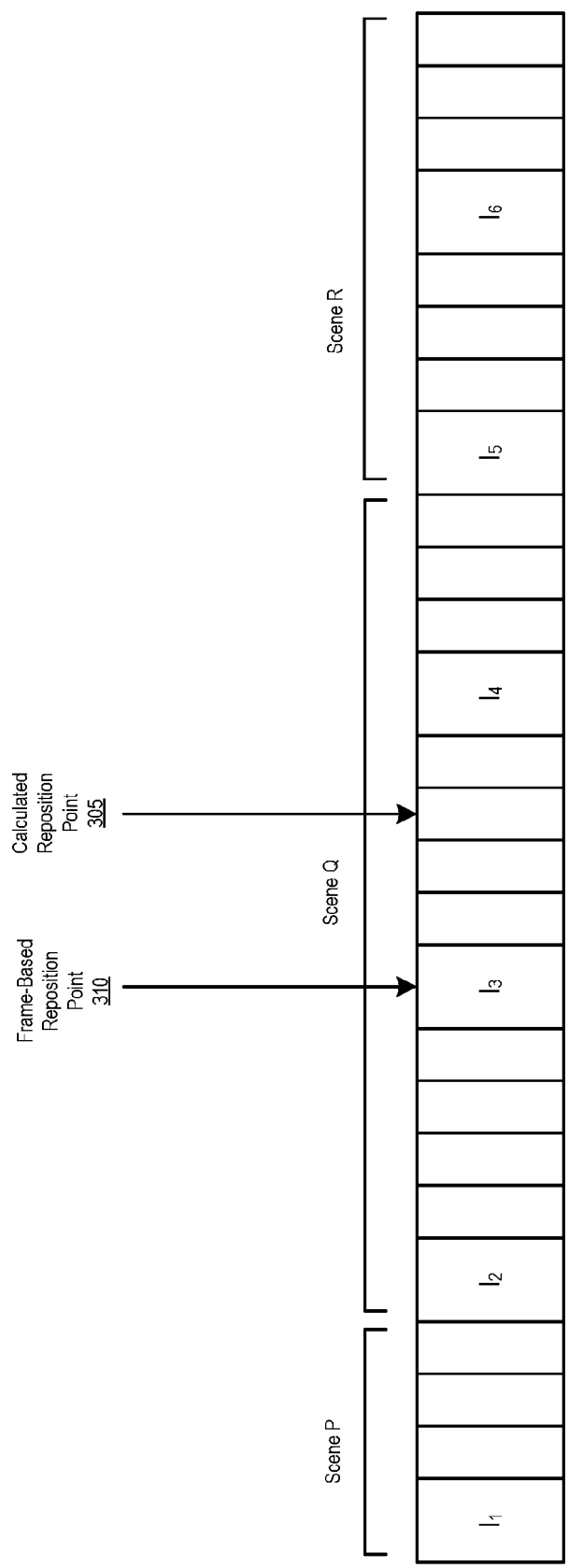
FIG. 4 shows a stream of frames associated with a piece of multimedia content, wherein each frame is associated with a scene.

FIG. 4 shows a stream of frames associated with a piece of multimedia content, wherein each frame is associated with a scene. The stream may include a plurality of I-frames (e.g., I1-6) and one or more other frames between I-frames. In embodiments, each frame within the stream of frames may be associated with a scene. For example, according to FIG. 3, I1 and the frames between I1 and I2 are associated with scene P, I2 and the frames between I2 and I5 are associated with scene Q, and I5, I6, and the frames following I5 and I6 are associated with scene R. It will be appreciated by those skilled in the relevant art that various techniques may be used to identify and track scene changes within a piece of multimedia content.

While a trickplay function (e.g., fast-forward, rewind, skip, seek, jump, etc.) is being carried out on the piece of content, and when an instruction is received to bring the content out of the trickplay status or otherwise resume normal playback of the content, a calculated reposition point 305 may be determined. The calculated reposition point 305 may be the frame that is determined to be the frame being displayed at the point in time when the instruction to exit trickplay was received.

In embodiments, the calculated reposition point 305 may be a frame other than an I-frame (as is the case in FIG. 4). A new entry point may be selected, for example, by the playback position module 230 of FIG. 2. The new entry point may be selected by repositioning a pointer at a frame other than the calculated reposition point 305. For example, the playback position module 230 may identify the first I-frame preceding the calculated reposition point 305 as the new entry point, and the pointer may be repositioned to the frame-based reposition point 310.

Figure 5:
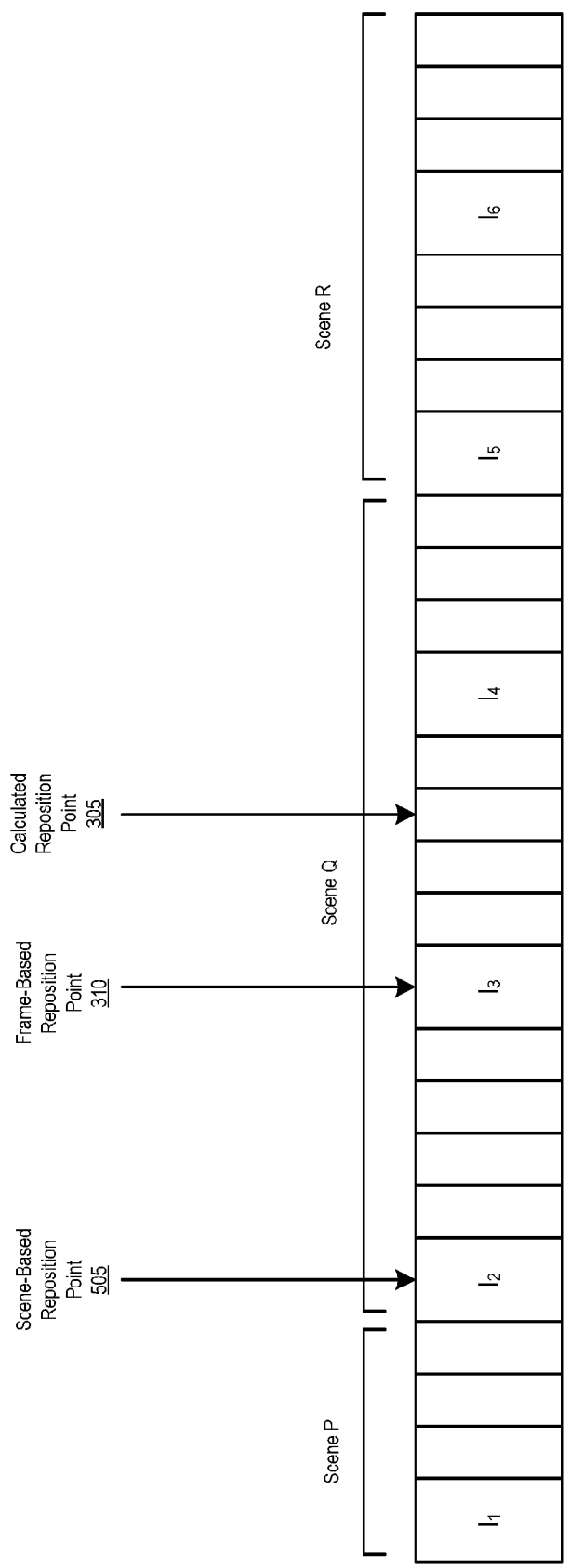
FIG. 5 shows a stream of frames associated with a piece of multimedia content, wherein each frame is associated with a scene, and wherein an entry point is determined based upon the identification of a scene boundary.

FIG. 5 shows a stream of frames associated with a piece of multimedia content, wherein each frame is associated with a scene, and wherein an entry point is determined based upon the identification of a scene boundary. The stream may include a plurality of I-frames (e.g., I1-6) and one or more other frames between I-frames. In embodiments, each frame within the stream of frames may be associated with a scene. For example, according to FIG. 5, I1 and the frames between I1 and I2 are associated with scene P, I2 and the frames between I2 and I5 are associated with scene Q, and I5, I6, and the frames following I5 and I6 are associated with scene R. It will be appreciated by those skilled in the relevant art that various techniques may be used to identify and track scene changes within a piece of multimedia content.

While a trickplay function (e.g., fast-forward, rewind, skip, seek, jump, etc.) is being carried out on the piece of content, and when an instruction is received to bring the content out of the trickplay status or otherwise resume normal playback of the content, a calculated reposition point 305 may be determined. The calculated reposition point 305 may be the frame that is determined to be the frame being displayed at or output to a display when the instruction to exit trickplay was received.

In embodiments, the calculated reposition point 305 may be a frame other than an I-frame (as is the case in FIG. 5). A new entry point may be selected, for example, by the playback position module 230 of FIG. 2. The new entry point may be selected by repositioning a pointer at a frame other than the calculated reposition point 305. For example, the playback position module 230 may identify the first I-frame preceding the calculated reposition point 305 as the new entry point, and the pointer may be repositioned to the frame-based reposition point 310. As another example, the playback position module 230 may identify the first frame of the scene associated with the calculated reposition point 305 as the new entry point, and the pointer may be repositioned to the scene-based reposition point 505. According to FIG. 5, the frame at the calculated reposition point 305 is within scene Q, thus the scene-based reposition point 505 is at the first frame of scene Q (e.g., I2).

Figure 6:
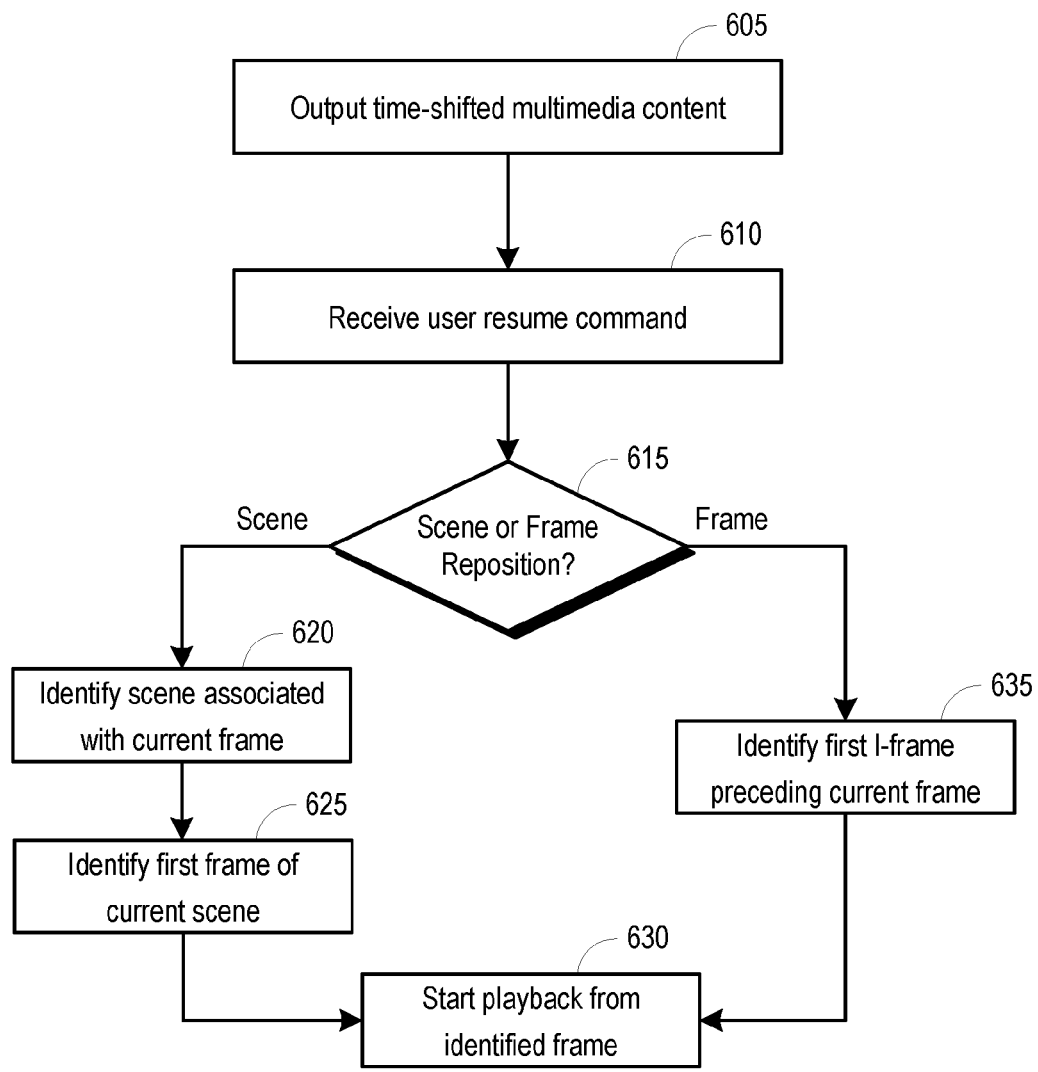
FIG. 6 is a flowchart illustrating an example process operable to facilitate the determination of a playback position based upon a scene boundary.

FIG. 6 is a flowchart illustrating an example process 600 operable to facilitate the determination of a playback position based upon a scene boundary. The process 600 may start at 605 where time-shifted multimedia content is output from a device (e.g., multimedia device 110 of FIG. 1). A trickplay function (e.g., fast-forward, rewind, skip, seek, jump, etc.) may be carried out on the multimedia content as the content is output from the device.

At 610, a user command is received instructing the device to bring the output of the multimedia content out of the trickplay mode. For example, the user command may be to resume, stop, or pause playback of the content.

At 615, a determination is made whether to calculate an entry point based on the scene or the first preceding I-frame associated with the current frame at which the content was removed from the trickplay status. For example, a user may be prompted to determine whether to resume playback of the content from the beginning of a scene associated with the point at which the content was removed from the trickplay mode or from the first I-frame preceding the point at which the content was removed from the trickplay mode. The user may be prompted through a user interface displayed at a screen through which the corresponding content is being displayed to the user, and the user input may be received at the device through a control interface (e.g., RCU interface, control interface 220 of FIG. 2, etc.). An entry point from which to begin playback of the content may then be determined based upon the user input. It should be understood that the multimedia device 110 (e.g., the playback position module 230 of FIG. 2) may be configured with a default option for selecting between two or more entry points. For example, the playback position module 230 may be configured to automatically begin playback of content coming out of trickplay at the first frame of the scene associated with the current frame. It should be further understood that a user selection of an entry point option may be used by the playback position module 230 to control future entry point decisions made with respect to the piece of content currently being viewed and/or content that is subsequently output by the multimedia device 110.

If, at 615, the determination is made to calculate the entry point based upon the scene associated with the current frame at which content was removed from the trickplay status, the process 600 can proceed to 620. At 620, the scene associated with the current frame may be identified. The scene associated with the current frame may be identified, for example, by the playback position module 230 of FIG. 2. For example, an association between frames of the multimedia content and scenes of the content may be retrieved from the content stream (e.g., by scene change detection module 240 of FIG. 2).

At 625, the first frame of the scene associated with the current frame may be identified. The frame may be identified, for example, by the playback position module 230 of FIG. 2. For example, the playback position module 230 may use scene change data associated with the multimedia content to identify the first frame of the scene associated with the current frame.

At 630, playback of the multimedia content may be started from the identified frame. For example, the playback position module 230 of FIG. 2 may create an entry point by repositioning a pointer at the identified frame (e.g., first frame of the scene associated with the current frame, first I-frame preceding current frame, etc.). Playback of the content may then be started from the entry point.

Returning to 615, if the determination is made to calculate the entry point based upon the first preceding I-frame associated with the current frame at which the content was removed from the trickplay status, the process 600 can proceed to 635. At 635, the I-frame preceding the current frame may be identified. The I-frame preceding the current frame may be identified, for example, by the playback position module 230 of FIG. 2. After the I-frame is identified, playback of the content may be started from the identified I-frame at 630.

Figure 7:
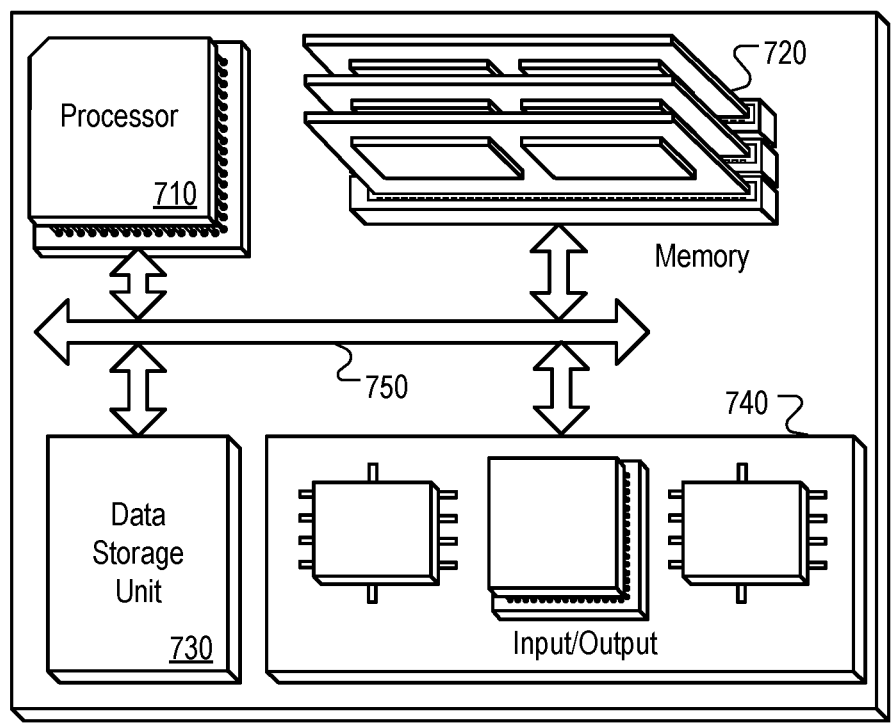
FIG. 7 is a block diagram of a hardware configuration operable to facilitate the determination of a playback position based upon a scene boundary.

FIG. 7 is a block diagram of a hardware configuration 700 operable to facilitate the determination of a playback position based upon a scene boundary. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting communications to a client device (e.g., client device 120 of FIG. 1). In another implementation, the input/output device can include driver devices configured to send communications to, and receive communications from one or more networks (e.g., local network 130 of FIG. 1, provider network 150 of FIG. 1, WAN 140 of FIG. 1, etc.).

It should be understood that the approach described herein does not introduce any additional search or positioning delay regardless of the content or playback speed. The approach may be implemented as a plug-in, thereby allowing devices deployed in the field to be easily upgraded.

Those skilled in the art will appreciate that the invention improves upon methods and systems for determining a playback position after a trickplay operation is carried out on a piece of multimedia. The methods, systems and computer readable media described herein facilitate the repositioning of content based upon scene boundaries. In embodiments, content may be automatically repositioned at a scene boundary, so that the content presentation starts from a more meaningful and sensible point after a re-position (e.g., time-shift, trickplay, seek, etc.). Also provided herein is an approach to provide an option for the user to start playback of content from an absolute time based repositioned point or a scene based repositioned point. Scene change detection may be used to detect scene changes within a piece of multimedia content as the content is being received, played, or recorded by a device. Scene changes within a piece of content may be identified using scene meta-data created on a per content basis, wherein the meta-data includes the starting frame offset of each scene along with the duration of the scene.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    applying a trickplay operation to a piece of multimedia content;
    in response to a received resume command, identifying a current frame based upon a current playback position within the piece of multimedia content at the point at which the resume command is received;
    identifying a scene associated with the current frame, wherein the scene is identified as a scene following a scene boundary that is nearest to the current frame;
    identifying a first frame of the scene, wherein the first frame of the scene comprises a first frame following the scene boundary that is nearest to the current frame;
    identifying an inline frame immediately preceding the current frame;
    outputting a prompt requesting a user to select between a playback of the piece of multimedia content from the first frame of the scene or from an inline frame immediately preceding the current frame, wherein the prompt comprises split video windows having a first window comprising a display of the first frame of the scene and a second window comprising a display of the inline frame immediately preceding the current frame;
    if playback of the multimedia content from the inline frame immediately preceding the current frame is selected, initiating playback of the piece of multimedia content from the inline frame immediately preceding the current frame;
    if playback of the multimedia content from the first frame of the scene is selected, initiating playback of the piece of multimedia content from the first frame of the scene; and
    using the selection of either the first window or the second window to control an identification of an entry point in response to a resume command that is received during a subsequent trickplay of the piece of multimedia content.

2. The method of claim 1, further comprising:
    receiving a user command to begin playback from the inline frame immediately preceding the current frame;
    creating an entry point at the inline frame by repositioning a pointer to the inline frame; and
    initiating playback of the piece of multimedia content from the inline frame.

3. The method of claim 1, wherein the first frame of the scene is identified from meta-data retrieved from the piece of multimedia content.

4. The method of claim 1, wherein one or more scene boundaries within the piece of multimedia content are identified and tagged as the piece of multimedia content is received, and wherein the first frame of the scene is identified based on the one or more tagged scene boundaries.

5. The method of claim 1, further comprising:
    creating an entry point at the first frame of the scene by repositioning a pointer to the first frame of the scene.

6. An apparatus comprising:
    a playback module configured to apply a trickplay operation to a piece of multimedia content;
    a control interface configured to be used to receive a resume command;
    a playback position module configured to identify a current frame based upon a current playback position within the piece of multimedia content at the point at which the resume command is received;
    a scene boundary module configured to:
        identify a scene associated with the current frame, wherein the scene is identified as a scene following a scene boundary that is nearest to the current frame; and
        identify a first frame of the scene, wherein the first frame of the scene comprises a first frame following the scene boundary that is nearest to the current frame;
        identify an inline frame immediately preceding the current frame;
        output a prompt requesting a user to select between a playback of the piece of multimedia content from the first frame of the scene or from an inline frame immediately preceding the current frame, wherein the prompt comprises split video windows having a first window comprising a display of the first frame of the scene and a second window comprising a display of the inline frame immediately preceding the current frame;
    the playback module being further configured to initiate playback of the piece of multimedia content from the inline frame immediately preceding the current frame if playback of the multimedia content from the inline frame immediately preceding the current frame is selected; and
    the playback module being further configured to initiate playback of the piece of multimedia content from the first frame of the scene if playback of the multimedia content from the first frame of the scene is selected; and
    wherein the scene boundary module is further configured to use the selection of either the first window or the second window to control an identification of an entry point in response to a resume command that is received during a subsequent trickplay of the piece of multimedia content.

7. The apparatus of claim 6, wherein:
    the control interface is further configured to be used to receive a user command to begin playback from the inline frame immediately preceding the current frame;

the playback position module is further configured to create an entry point at the inline frame by repositioning a pointer to the inline frame; and the playback module is further configured to initiate playback of the piece of multimedia content from the inline frame.

8. The apparatus of claim 6, wherein the first frame of the scene is identified from meta-data retrieved from the piece of multimedia content.

9. The apparatus of claim 6, wherein one or more scene boundaries within the piece of multimedia content are identified and tagged as the piece of multimedia content is received, and wherein the first frame of the scene is identified based on the one or more tagged scene boundaries.

10. One or more non-transitory computer readable media having instructions operable to cause one or more processors to perform the operations comprising:

applying a trickplay operation to a piece of multimedia content;

in response to a received resume command, identifying a current frame based upon a current playback position within the piece of multimedia content at the point at which the resume command is received;

identifying a scene associated with the current frame, wherein the scene is identified as a scene following a scene boundary that is nearest to the current frame;

identifying a first frame of the scene, wherein the first frame of the scene comprises a first frame following the scene boundary that is nearest to the current frame;

identifying an inline frame immediately preceding the current frame;

outputting a prompt requesting a user to select between a playback of the piece of multimedia content from the first frame of the scene or from an inline frame immediately preceding the current frame, wherein the prompt comprises split video windows having a first window comprising a display of the first frame of the scene and a second window comprising a display of the inline frame immediately preceding the current frame;

if playback of the multimedia content from the inline frame immediately preceding the current frame is selected, initiating playback of the piece of multimedia content from the inline frame immediately preceding the current frame;

if playback of the multimedia content from the first frame of the scene is selected, initiating playback of the piece of multimedia content from the first frame of the scene; and using the selection of either the first window or the second window to control an identification of an entry point in response to a resume command that is received during a subsequent trickplay of the piece of multimedia content.

11. The one or more non-transitory computer-readable media of claim 10, wherein the instructions are further operable to cause one or more processors to perform the operations comprising:

receiving a user command to begin playback from the inline frame immediately preceding the current frame;

creating an entry point at the inline frame by repositioning a pointer to the inline frame; and initiating playback of the piece of multimedia content from the inline frame.

12. The one or more non-transitory computer-readable media of claim 10, wherein the first frame of the scene is identified from meta-data retrieved from the piece of multimedia content.

13. The one or more non-transitory computer-readable media of claim 10, wherein one or more scene boundaries within the piece of multimedia content are identified and tagged as the piece of multimedia content is received, and wherein the first frame of the scene is identified based on the one or more tagged scene boundaries.

14. The one or more non-transitory computer-readable media of claim 10, wherein the instructions are further operable to cause one or more processors to perform the operations comprising:

creating an entry point at the first frame of the scene by repositioning a pointer to the first frame of the scene.

* * * * *